United States Patent [19]

Jonassen

[11] 4,370,869
[45] Feb. 1, 1983

[54] GEAR-TYPE UNIVERSAL COUPLING

[76] Inventor: Jorgen W. Jonassen, 120 Overlook Ter., Bloomfield, N.J. 07003

[21] Appl. No.: 58,833

[22] Filed: Jul. 18, 1979

[51] Int. Cl.³ .............................................. F16D 3/18
[52] U.S. Cl. .................................... 464/156; 464/159
[58] Field of Search ........................ 64/7, 9 R, 9 A, 21

[56] References Cited

U.S. PATENT DOCUMENTS

| 1,191,739 | 7/1916 | Schurman | 64/7 |
| 1,262,561 | 4/1918 | Ream | 64/7 |
| 1,277,491 | 9/1918 | Scott | 64/7 |
| 1,418,380 | 6/1922 | Keck | 64/7 |
| 1,450,805 | 4/1923 | Hart Sprazz | 64/9 A |
| 2,128,088 | 8/1938 | Hanft | 64/21 |
| 2,574,226 | 11/1951 | Sampson | 64/9 A |
| 3,054,275 | 9/1962 | Ongaro | 64/9 R |
| 3,083,549 | 4/1963 | Benson | 64/21 |
| 3,392,548 | 7/1968 | Meyer | 64/7 |
| 3,584,474 | 6/1971 | Church | 64/9 A |
| 3,613,394 | 10/1971 | Federline | 64/7 |
| 4,133,189 | 1/1979 | Rineer | 64/21 |

Primary Examiner—Ira S. Lazarus
Attorney, Agent, or Firm—Hopgood, Calimafde, Kalil, Blaustein & Judlowe

[57] ABSTRACT

The invention contemplates a universal coupling wherein rotatable input and output members are coupled both (1) for universal flexible accommodation of the instantaneous angular orientation (misalignment) of their rotary axes about a single point of axis intersection and (2) for gear-tooth drive engagement in the transmission of torque from one to the other of these members. The result is to achieve both (1) and (2) above (a) for a greater range of axis misalignment than is possible with universal couplings of the past, (b) with greater uniformly high torque transmission as a function of incremental rotation of the coupling members, and (c) with symmetry of torque-transmitting force development with respect to the axes of rotation.

10 Claims, 17 Drawing Figures

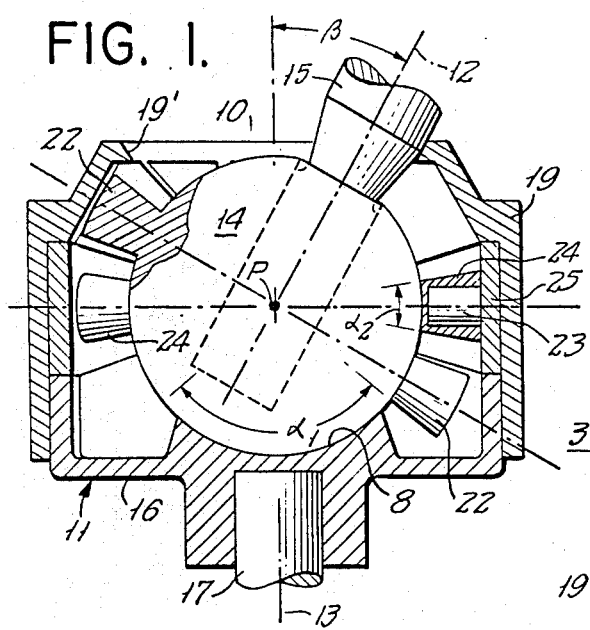
FIG. 1.
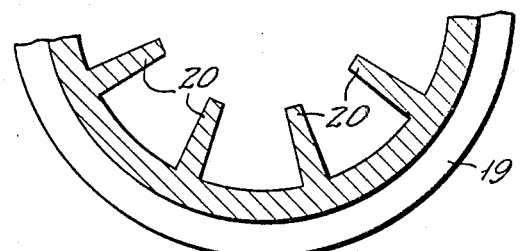
FIG. 3.
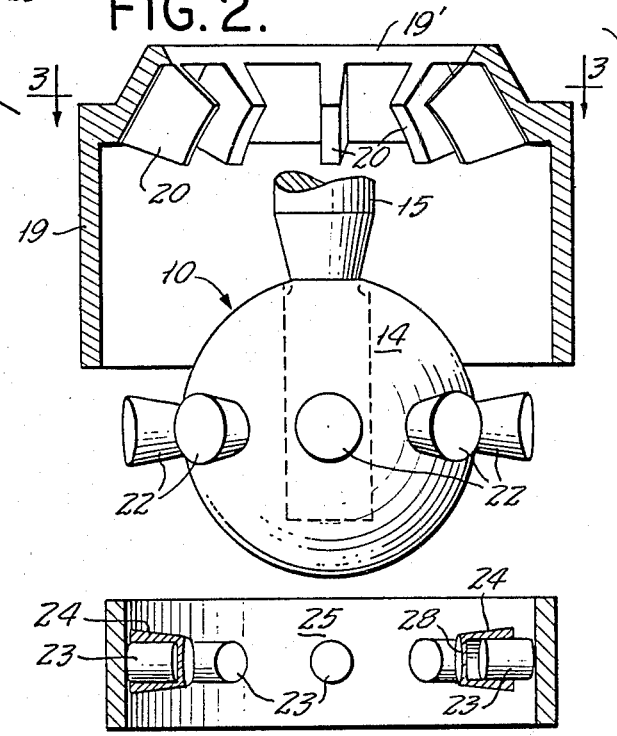
FIG. 2.
FIG. 4.
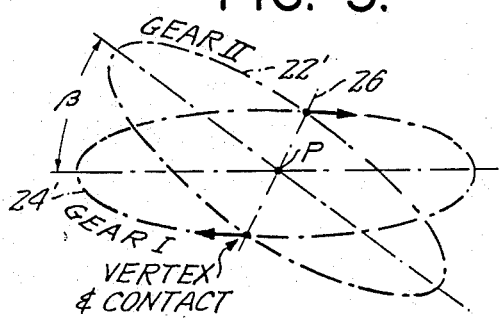
FIG. 5.
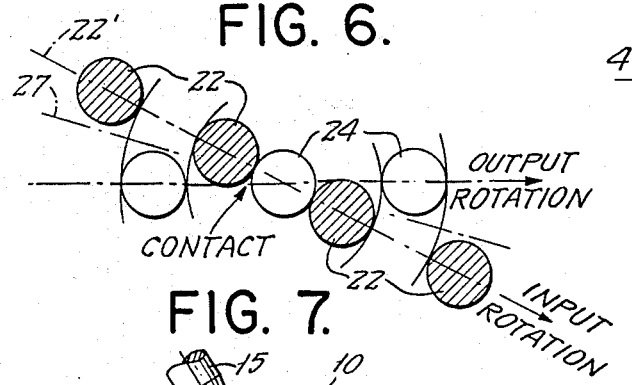
FIG. 6.
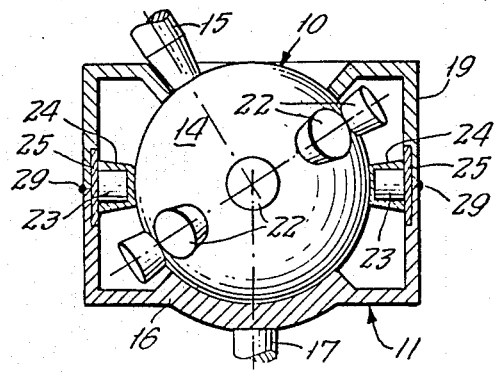
FIG. 7.

GEAR-TYPE UNIVERSAL COUPLING

BACKGROUND OF THE INVENTION

The invention relates to universal coupling mechanism for flexible torque-transmitting interconnection of rotatable input and output members, and in particular to such mechanisms which employ meshing gear teeth for torque transmission.

The conventional universal joint has remained essentially the same since its invention by Robert Hooke in 1676. It involves like input and output rotatable coupling members with bifurcated ends which are held in quadrature interlace by a first diametrically extending pin-axis connection of the bifurcated ends of the input member to an intermediate coupling member, and by a second diametrically extending pin-axis connection of the bifurcated ends of the output member to the same intermediate coupling member. Neat as Mr. Hooke's solution was, his coupling is necessarily severely limited as to tolerable degree of angular misalignment of the input and output rotary axes and as to the uniformity with which torque may be transmitted in the course of a single revolution of the coupling. Such limitations remain to this day, for such universal-joint constructions of which I am aware.

SUMMARY OF THE INVENTION

It is an object of the invention to provide an improved universal coupling of the character indicated.

A specific object is to provide such a coupling with inherent utility over a greater range of angular misalignment than heretofore.

Another specific object is to provide inherently greater and better torque-transmitting capability in such a coupling.

A further object is to employ basically simple structure in accomplishing the above objects.

It is also a specific object to meet the above objects with structure which is to an extent modular to thereby enable ganged series-connection of multiple couplings for even greater angular offset of the input and output axes of rotation.

The invention achieves the foregoing and other objects and features by providing rotatable input and output members with coacting formations to retain the same point of intersection of their respective rotary axes while permitting angular flexibility to said axes about said point of intersection. A first plurality of radially outward tooth formations in the radial plane of said point on one of said members meshes with radially inward tooth formations of a corresponding second plurality in the radial plane of said point on the other of said members. The teeth of both pluralities are each right-frusto-conical, each tooth being on a radial axis which intersects said point, and each tooth being geometrically convergent to said point. The meshing teeth which are at any given part of the rotary cycle involved in torque transmission are in or substantially in the geometrical plane (a) which bisects the instantaneous angle between the intersecting input and output axes of rotation and (b) which is normal to the geometrical plane which includes and is therefore defined by said axes of rotation.

DETAILED DESCRIPTION

The invention will be described in detail for various illustrative embodiments, in conjunction with the accompanying drawings, in which:

FIG. 1 is a simplified sectional view of a coupling between rotary axes which are shown to be angularly misaligned about the point of their intersection, the section being taken in the geometrical plane which includes both axes of rotation;

FIG. 2 is an exploded view of the parts of FIG. 1, for the aligned relation of the rotary axes;

FIG. 3 is a sectional view taken at 3—3 in FIG. 2;

FIG. 4 is an inside-end view of one of the parts of FIG. 2, taken from the aspect 4—4 of FIG. 2;

FIG. 5 is a somewhat schematic isometric diagram to illustrate intersecting orbits of tooth elements in the course of rotation of the coupling of FIG. 1;

FIG. 6 is a fragmentary and somewhat schematic diagram to illustrate an instantaneous relation between successive input-member teeth and output-member teeth on both sides of one of their regions of meshing relation;

FIGS. 7 and 8 are views similar to FIG. 1, to show modifications;

Figure 8:
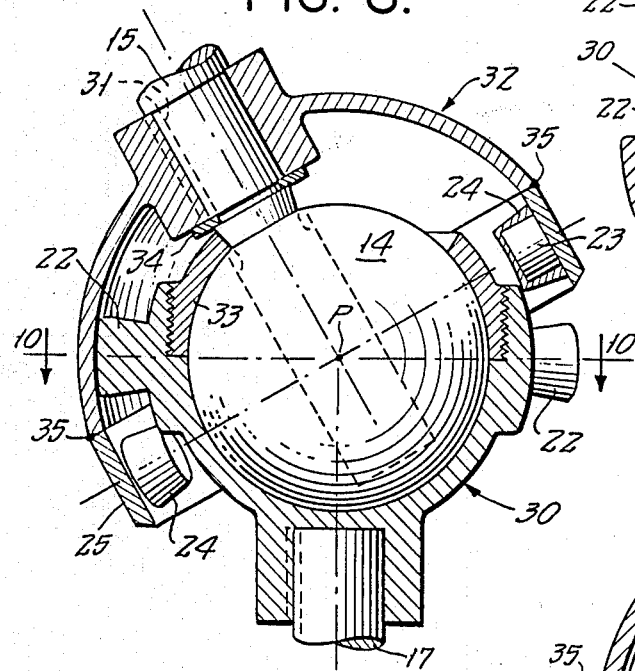
Figure 10:
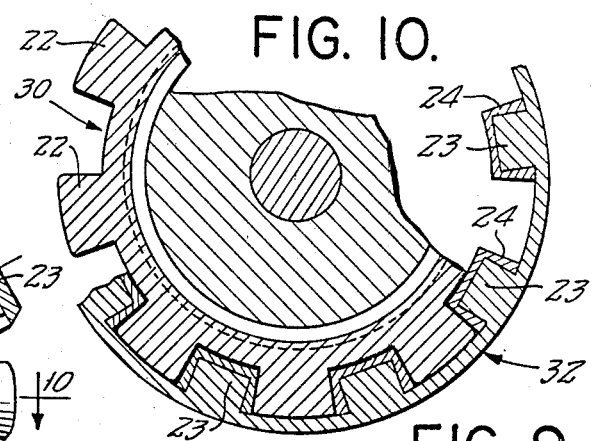
FIG. 10 is a sectional view taken at 10—10 in FIG. 8.
Figure 9:
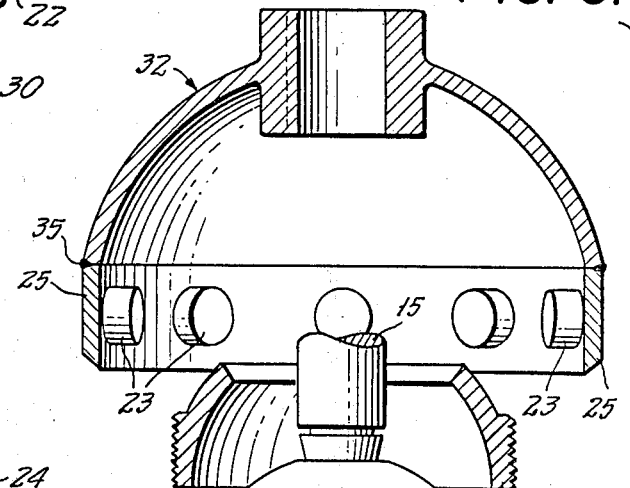
FIG. 9 is an exploded view similar to FIG. 2 but applicable to the structure of FIG. 8.

In FIGS. 1 to 4, the invention is shown in application to first and second coupling members 10-11 on separate axes of rotation 12-13 which intersect at a point P. The coupling members 10-11 have freedom to change the degree of aligned or misaligned relation between their axes 12-13, through universal swivel action about the point P, the center of their articulation. To this end, the coupling members 12-13 have coacting formations, in the nature of a ball-and-socket joint, to assure constancy of the articulation center point P. As shown, member 10 embodies a centering ball 14 fixedly mounted to the suitably formed end of a shaft 15, and member 11 has the socket formations, namely, a first cupped half 16 fixedly mounted to a shaft 17 and having within its closed end a central concave spherical ball seat 18 of limited extent $\alpha_1$ about the point P, and a second cupped half 19 having a series of angularly spaced ball-stabilizing radially inward feet 20; feet 20 are adjacent the rim 19' of a large central opening in the reduced end of the cupped half 19, allowing a wide range universal freedom $\pm\beta$ for articulation of axes 12-13 about point P. Another and similar series of angularly spaced ball-stabilizing inward feet 21 is provided within the cupped half 16. And the ball-contacting inner surfaces of feet 20-21 will be understood to be formed to the same concave spherical geometrical surface as that of seat 18, thereby effectively fixing the position of point P, when the cylindrical walls of the cupped halves 16-19 are secured in telescoped relation, as shown in FIG. 1.

In accordance with the invention, torque transmission from one to the other of the coupling members 10-11 is accomplished via a series of radially inward teeth carried by one coupling member and meshing with a corresponding series of radially outward teeth carried by the other coupling member, and it makes no difference which of these members is the input or driving member and which is the output or driven member. As shown, the radially outward series of teeth 22 is carried by the ball 14, and the radially inward series of teeth consists of cylindrical studs 23 to each of which a bushing 24 has been rotatably fitted, the studs 23 being angularly spaced around and fixed to the bore of a mounting ring 25, and ring 25 in turn being in fixed centrally seated relation within the fitted confines of the cupped halves 16-19 of member 11. The number $n$ of teeth in each series is the same and may be odd or even; as shown, the number of teeth in each series is nine. And each tooth has a frusto-conical outer surface which converges to the point P; preferably, the angular spread $\alpha_2$ of each frusto-conical tooth surface is substantially $\pi/n$ radians, so that at alignment of the shaft axes 12-13, the then fully meshing tooth surfaces 22-24 of both series will account for substantially $2\pi$ radians, i.e., substantially the full circumferential extent.

FIG. 5 illustrates that, for a given angular misalignment $\beta$ as between the axes 12-13, the teeth 24 orbit about the center P in a first plane 24' that is normal to the axis 13, while the teeth 22 orbit around the center P in a second plane 22' that is normal to the axis 12. These planes and orbits intersect on an alignment 26 which represents a diameter common to the respective orbits, and the alignment 26 is always through the point P and perpendicular to the plane common to (i.e., defined by) the intersecting misaligned axes 12-13. It is in the region of approach to and departure from the alignment 26 that teeth 22-24 have their torque-transmitting meshing relation, as becomes apparent from the fragmentary diagram of FIG. 6, wherein shading in one set of teeth (22) is used to more clearly differentiate said one set from the other set (24). The relation depicted in FIG. 6 will be understood to apply for each of the diametrically opposite points of orbit intersection, the force reactions upon toothed engagement at the respective orbit intersections being equal and opposite, as denoted by vector arrows at these intersections in FIG. 5. Stated in other words, upon approach to each of the orbit-intersection points, the teeth 24 of one set may be viewed as gradually approaching a median plane 27 from one side, while the teeth 22 of the other set make a correspondingly gradual approach to the opposite side of the same plane 27, said plane 27 including the point P and the alignment 26, and being the bisector of the instantaneous angle between orbits 22'-24'. As a practical matter, each tooth-to-tooth contact is a line contact (aligned with center P) and is operative over a range of shaft-increment angles such that torque is always being effectively transmitted in substantially equal and opposite magnitudes at both zones of orbit intersection, with total symmetry about the point P and both rotary axes 12-13. And by providing a rotary bushing 24 on each of the teeth of one set, it is assured that all torque-transmitting contacts will be rolling contacts, with attendant low-friction action throughout the shaft-angle range for which each tooth-to-tooth contact is serving its torque-transmitting function.

Although elements 24 are described as bushings, in view of their indicated function, it will be understood that, in addition to being charcterized by a frusto-conical outer surface and cylindrical bore, they may be cupped, as shown, with a closed end 28 adjacent the sphere of ball 14, said closed end being concaved to the radius of the ball sphere for ball-piloted location of each bushing 24. The material of bushings 24 will depend upon the load to be transmitted, and for all but the heaviest-duty applications, bushings 24 may be injection-molded of a suitable low-friction material such as high-density polyethylene, polypropylene or the like.

The arrangement of FIG. 7 will be recognized for its similarity to FIG. 1 and therefore many of the same reference numbers are used, for corresponding parts. The principal differences in FIG. 7 are that the mounting ring 25 for studs 23 is fixedly seated in corresponding adjacent counterbores of the respective cupped halves 16-19, which are thereafter secured as by welding, suggested at 29.

The embodiment of FIGS. 8 to 11 is illustrated by drawings which are the close counterpart of FIGS. 1 to 4, the difference being that ball-and-socket retention of the center P in FIGS. 8 to 11 is completely independent of the torque-transmitting function of teeth of the inner and outer sets 22 and 23-24. The shaft 17, which will be referred to as the input shaft (although it could just as well be the output shaft) is fixed to a coupling member 30 which is again a cupped half but which has an inner surface in the form of a concave hemisphere, to match and slidingly nest the sphere of ball 14, to which the output shaft 15 is affixed. Also affixed to shaft 15, as by key means 31, is a cupped member or shell 32, substantially hemispheric about the center P and at radial offset from member 30, to an extent permitting the respective sets of coacting teeth 22 (23-24) to be carried by radially opposed orbit-encompassing regions of the members 30-32. A retainer ring 33 with concave spherical ball-engaging inner surface is secured as by threads to a threaded counterbore in member 30, and a snap-ring 34 in a groove formation provides a locating shoulder to assure correct positioning of member 32 with respect to the articulation center P. The studs 23 of the outer teeth 24 are again precisely and fixedly mounted to a ring member which may be welded at 35 to become a permanent part of the driven coupling member 32.

Figure 12:
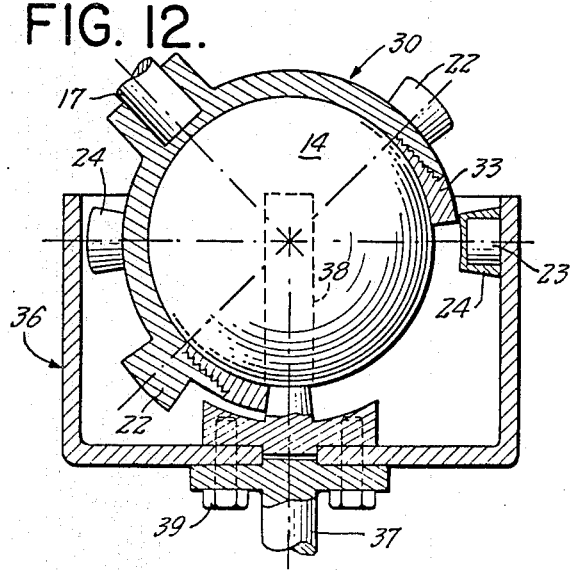
FIG. 12 is a view similar to FIG. 1, to show a modification of FIG. 8.

FIG. 12 will be recognized for its similarity to FIG. 8, and therefore the same reference numbers identify parts which functionally correspond. The principal differences reside in use of a cupped cylindrical shaping of the outer shell 36 which carries the studs 23 for the radially inward rotatable teeth 24, and also in the manner in which shell 36 is fixedly mounted to the flanged end of its shaft 37. As shown, the closed end of shell 36 has a central aperture which centrally locates a center projection of the end of shaft 37 and which also centrally locates a corresponding central projection of a flanged stub shaft 38 which is the means of connection to ball 14. Bolts 39 clamp the flanges of shaft means 37-38 to each other and to the shell 36.

Figure 13:
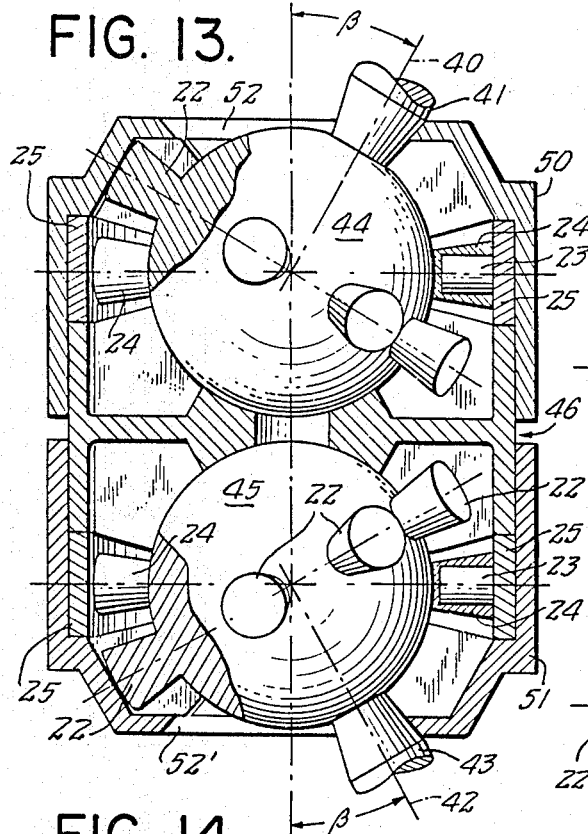
FIG. 13 is a view similar to FIG. 1, to show a two-stage coupling of the invention, embodying the basic modular structure of FIG. 1.
Figure 14:
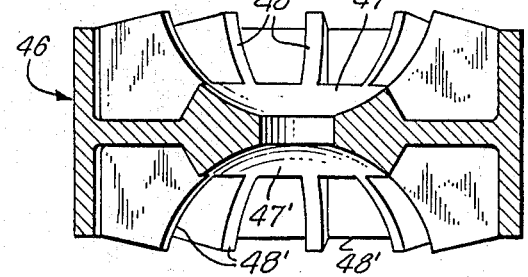
FIG. 14 is a longitudinal sectional view of one of the parts of FIG. 13.

FIG. 13 illustrates that the described embodiment of FIGS. 1 to 4 is essentially modular in nature, lending itself to back-to-back series-connection in order to achieve an effective doubling of the degree of off-axis misalignment through which torque may be transmitted. This misalignment is depicted as $2\beta$, as between the axis 40 of an input shaft 41 and the axis 42 of an output shaft 43, each of the shafts 41 (43) being keyed to its own ball 44 (45). A special intermediate ring-like member 46 provides closely adjacent concave spherical ball seats 47–47' of the nature described at 18, along with spherically finished ball-engaging feet 48–48' of the nature described at 21. First and second rings 25 carry the studs for radially inward tooth sets 24 serving the radially outward tooth sets 22 on each of the respective balls, rings 25 being spaced by the cylindrical periphery of member 46 and fixedly seated in counterbores of outer cupped half members or shells 50–51. Ball-engaging feet with concave-spherical inner surfaces, as described at 20 (FIGS. 1, 2, 3) will be understood to characterize shells 50–51 near the rims of their respective end openings 52–52'.

Figure 15:
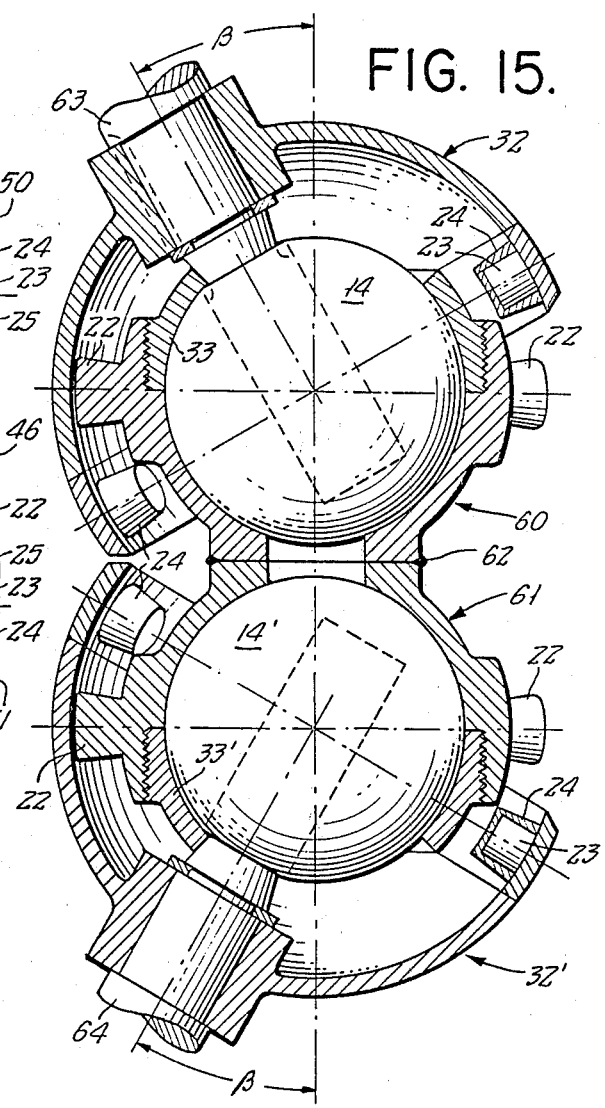
FIG. 15 is a view similar to FIG. 13, to show another two-stage coupling of the invention, embodying the basic modular structure of FIG. 8.
Figure 16:
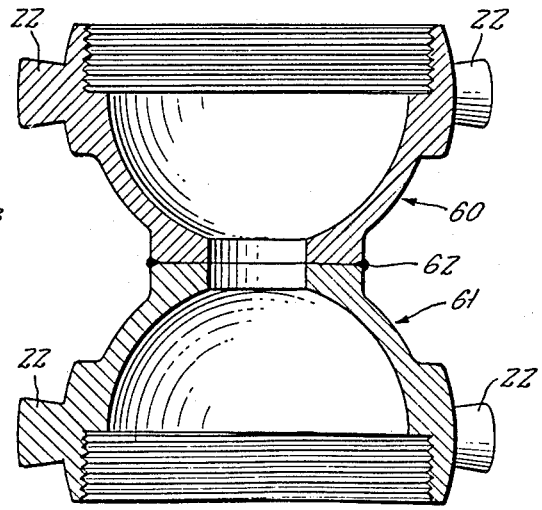
FIG. 16 is a longitudinal sectional view of one of the parts of FIG. 15.

FIGS. 15 and 16 illustrate the modular nature of the embodiment of FIGS. 8 to 11, in a back-to-back series-connected or tandem arrangement of two modules. The truncation is made at the base of the hub 30' (FIG. 9) of the coupling member 30, to produce first and second such members 60–61 which are shown welded back-to-back at 62. Each half of the tandem-connected double joint of FIG. 15 is otherwise as described for the coupling of FIGS. 8 to 11 and therefore the same reference numbers are employed to identify cooperating elements for smooth torque transmission between shafts 63–64, over the widely divergent axis-misalignment range $2\beta$. Thus, a first ball 14 and coupling shell 32 (with radially inward teeth 24) are fixedly mounted to the end of shaft 63, and a corresponding ball 14' and coupling shell 32' (with radially inward teeth 24) are fixedly mounted to the end of shaft 64. And the twin coupling members 60, each with its set of radially outward teeth 22, are held by their respective retaining rings 33–33' to the balls 14–14'.

Figure 17:
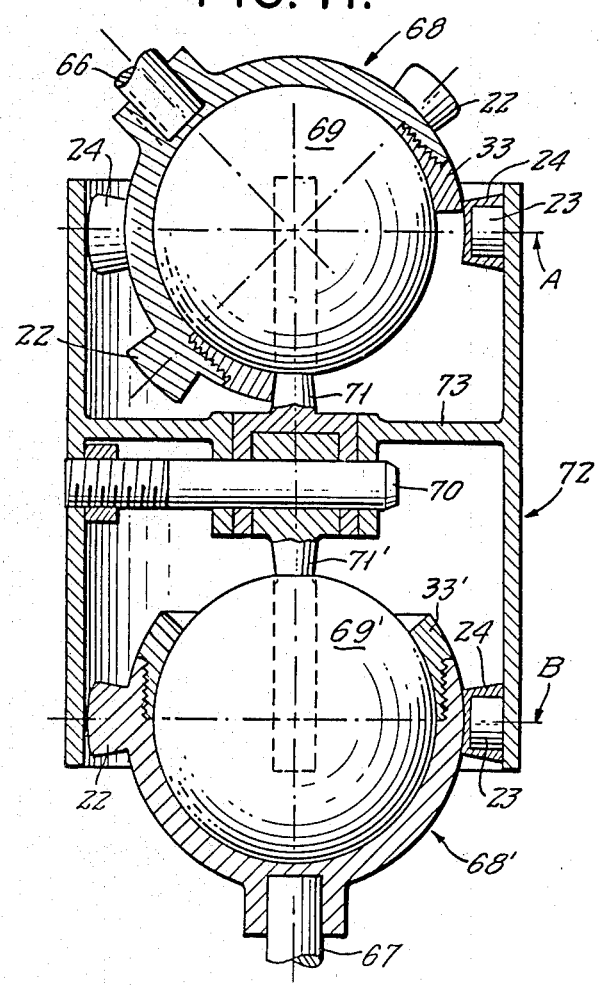
FIG. 17 is another view similar to FIG. 13, to show a further two-stage coupling of the invention, embodying the basic modular structure of FIG. 12.
Figure 11:
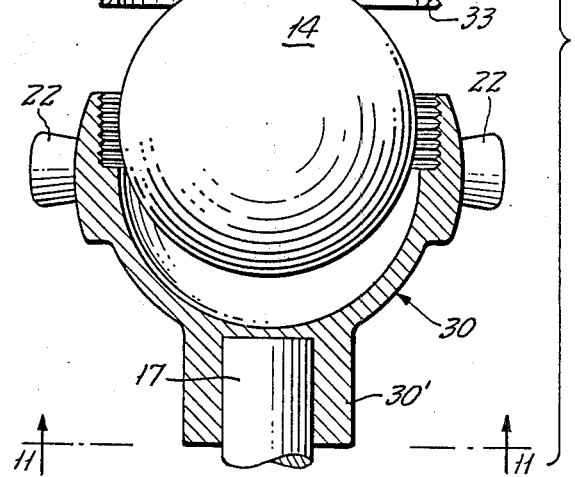
FIG. 11 is a fragmentary end view of one of the parts of FIG. 9, taken from the aspect 11—11 of FIG. 9.
Figure 11:
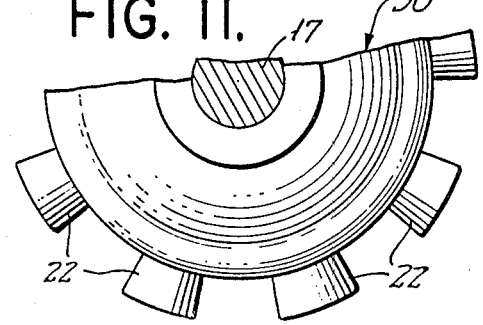

The embodiment of FIG. 17 will be recognized as a tandem employment of the basic modular structure of FIG. 12, for coupling shafts 66–67 with a $2\beta$ range of angular flexibility. The shaft 66 is fixed to the upper coupling or socket member 68 which with its retaining ring 33 locates the upper ball 69, and shaft 67 is similarly fixed to the lower coupling or socket member 68' to locate on the lower ball 69'. The balls 69–69' are interconnected by a pin connection 70 through telescopically lapped regions of their respective stub shafts 71–71'. The members 68–68' are each equipped with a set of radially outward teeth 22, and the respective open ends of a cylindrical shell member 72 mount the studs 23 for radially inward teeth 23 in each of two sets (at levels denoted A-B) to mesh with the respective tooth sets 22 of balls 69–69'. A mounting bulkhead 73, forming part of shell 72 has a cylindrical hub in which the telescoped ends of stub shafts 71–71' are received and held (by pin 70). Preferably, pin 70 has a sufficiently threaded shank, as shown, to enable manipulating access and threadlocking via a locally tapped region of shell 72.

The various described embodiments will be seen to have achieved all stated objects of the invention. Polar-coordination is an expression which may be applied to explain why my coupling lends itself so favorably to torque transmission, with such a wide range of angular misalignment $\beta$. By polar-coordination is meant that all actions and all cooperating surfaces have the same coordinated referencing to the center P. This is the center of ball-and-socket swivel universality. It is also the center of orbiting for both sets of the teeth which mesh, and it is the center to which all tooth axes and all frusto-conical tooth surfaces (and all line contacts between meshing teeth) converge. Power transmission by-passes the ball-and-socket engagement, because torque is not concentrated at one point but rather at two diametrically opposite locations, whereby ball-reaction force is substantially eliminated. Friction and wear between teeth is minimized by the roller-like (rotatable) suspension of the teeth of at least one set, here described as the radially inwardly directed set 23–24. As indicated, use of low-friction material at 24 may provide the sole lubrication needed for many applications; for heavier-duty applications, each ball (14) need not be solid but could contain a reservoir for lubricant, to be dispensed gradually under centrifugal force.

With an even number $n$ of teeth in each of the sets 22–24, there are diametrically paired contacts, for every tooth distance or pitch. With an odd number $n$ of teeth in each of the sets 22–24, there is a succession of single contacts every half pitch, although the range of shaft-angle advance for operability of such single contacts is found to be sufficient for the contacts to be effectively diametrically paired, even though the number $n$ may be odd, as in the nine-tooth per set example herein described. Both the $n$-odd and $n$-even cases have their specific fields of use, $n$-odd providing the smoothest operation for large values of $\beta$, and $n$-even providing the greatest torque transmitting capability that is entirely free of ball-and-socket reaction.

The parts are basically simple, and the cylindrical-shell configurations of FIGS. 12 and 17 are to be preferred for largest values of $\beta$, being shown in these figures to provide for $\beta=45°$, as determined by freedom of the stub shaft 38 (71–71') within the opening of the ball-retaining ring 33.

While the invention has been described in detail for preferred forms shown, it will be understood that modifications may be made without departing from the scope of the claimed invention.

What is claimed is:

1. A gear-type torque-transmitting universal coupling, comprising rotatable input and output members having coacting formations to retain the same point of intersection of their respective rotary axes while permitting angular flexibility of the relative orientation of said axes about said point of intersection, a first plurality of radially outward tooth formation in the radial plane of said point on one of said members, a second and corresponding plurality of radially inward tooth formations in the radial plane of said point on the other of said members, the teeth of said first and second pluralities being angularly interlaced and all teeth being right-frusto-conical, each tooth being on a radial axis which intersects said point and each tooth being geometrically convergent to said point.

2. The coupling of claim 1, in which the number of teeth in each plurality is even, whereby for a given angular misalignment of said rotary axes, torque-transmitting tooth contacts are paired and concurrent with diametrically opposite symmetry about said point.

3. The coupling of claim 1, in which the number of teeth in each plurality is odd, whereby for a given angular misalignment of said rotary axes, the number of successive torque-transmitting tooth engagements per revolution of said coupling in a single direction of rotation is double the number of teeth in each plurality.

4. The coupling of claim 1, in which said input and output members comprise one of two like coupling stages series-connected to each other, the output member of the first stage being fixedly connected to and in axially aligned orientation with respect to the input member of the second stage.

5. The coupling of claim 1, in which said input and output members comprise a first of two like coupling stages in series-connected relation, the output member of the first stage having its input-member coacting formations in duplicate at each of its opposite axial ends, thereby constituting said output member as a fixed interstage connection between first-stage and second-stage articulation centers which are fixedly spaced along the rotary axis of said output member, the remaining member of the second stage being engaged to the axial end opposite to that of input-member engagement.

6. The coupling of claim 1, in which each tooth of one of said pluralities comprises a stud with a rotatable bushing journaled thereon, the external surface of said bushing being the frusto-conical surface of said tooth.

7. The coupling of claim 1, in which said coacting formations comprise a ball formation on one of said members with the teeth of said one member projecting outwardly of said ball formation, and a socket formation on the other of said members, said other member circumferentially surrounding said one member in radially spaced relation and the socket formation comprising plural radially inward ball-engaging stabilizing projections at locations angularly spaced from the teeth of said other member and clear of the path of movement of the teeth of said member during rotation of said members for a maximum misalignment condition of said rotary axes.

8. The coupling of claim 1, in which said coacting formations comprise a ball formation on one of said members, a ball-guided socket body on the other of said members, the teeth of said other member projecting radially outwardly from said socket body, and a circumferentially continuous ring forming part of said one member and surrounding the teeth of said other member, the teeth of said one member projecting radially inwardly from said ring.

9. The coupling of claim 7 in which said other member comprises a circumferentially continuous ring surrounding the teeth of said one member and carrying the inwardly extending teeth of said other member, and separate cupped end caps at opposite axial ends of said ring, said ball-engaging stabilizing projections being formations of said end caps.

10. A gear-type torque-transmitting universal coupling, comprising rotatable input and output members having coacting formations to retain the same point of intersection of their respective rotary axes while permitting angular flexibility of the relative orientation of said axes about said point of intersection, a first plurality of radially outward tooth formations in the radial plane of said point on one of said members, a second and corresponding plurality of radially inward tooth formations in the radial plane of said point on the other of said members, the teeth of said first and second pluralities being angularly interlaced and all teeth having tooth-contacting surfaces which at tooth-to-tooth contactability are portions of geometrically right-frusto-conical surfaces, the axis of each geometrically right-frusto-conical surface portion being radial and aligned with and intersecting said point, and each of said geometrically right-frusto-conical surface portions being geometrically convergent to said point.

* * * * *